United States Patent [19]

Jensen et al.

[11] 3,716,435
[45] Feb. 13, 1973

[54] METHOD OF MAKING A CONTAINER BODY

[75] Inventors: Stephen F. Jensen, Bronx, N.Y.; William A. Meyer, South Salem, both of N.Y.

[73] Assignee: American Can Company, New York, N.Y.

[22] Filed: Nov. 16, 1970

[21] Appl. No.: 89,851

Related U.S. Application Data

[62] Division of Ser. No. 764,273, Oct. 1, 1968, Pat. No. 3,540,490.

[52] U.S. Cl. ................156/195, 93/94, 156/190, 229/4.5
[51] Int. Cl. ...............................................B31c 3/04
[58] Field of Search ...156/190, 195; 138/144; 93/94; 229/4.5

[56] References Cited

UNITED STATES PATENTS 3,157,337  11/1964  Elam ..................................229/4.5
3,279,675  10/1966  Elam et al. ........................229/4.5
3,280,709  10/1966  Elam ..............................156/190 X

*Primary Examiner*—Alfred L. Leavitt
*Assistant Examiner*—David A. Simmons
*Attorney*—Leonard R. Kohen

[57] ABSTRACT

A tubular, spirally wound multi-ply container body includes a body ply of fiber stock which has a liquid-proof barrier layer prelaminated or otherwise preaffixed to one surface thereof. Material on the reverse side of both marginal edge portions of the resultant laminated ply is removed by a skiving operation, thereby reducing the thickness of the marginal edge portions. One of the thinned, skived, marginal edge portions is folded back on itself, and this folded edge portion is then helically wound in lapping relationship to the unfolded edge portion and bonded to it to form a sealed helical lap seam having a thickness substantially equal to that of the unskived portions of the ply.

1 Claim, 7 Drawing Figures

PATENTED FEB 13 1973      3,716,435
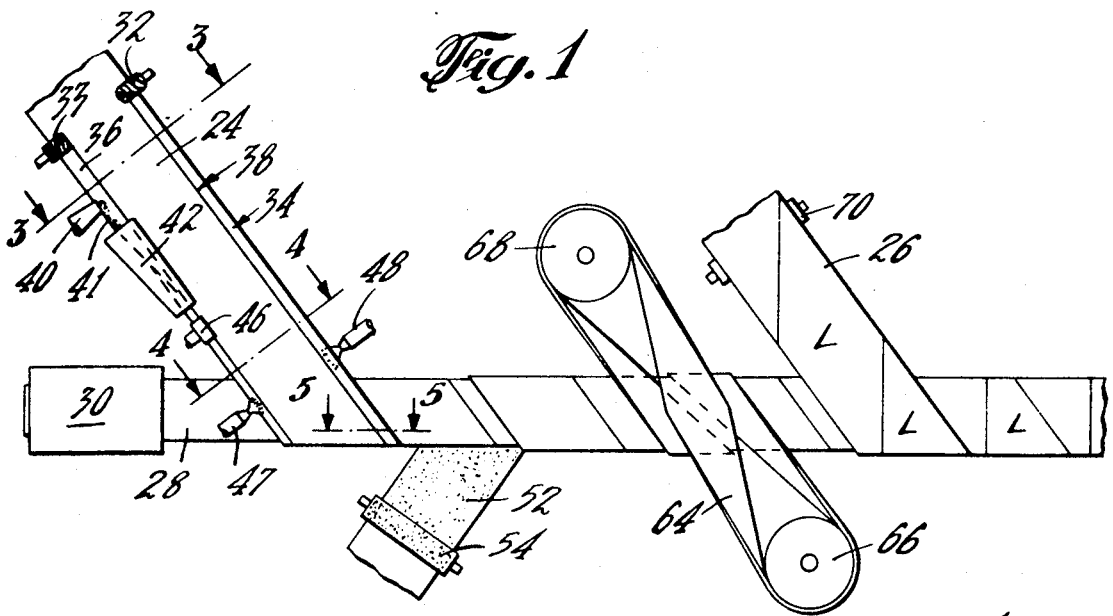
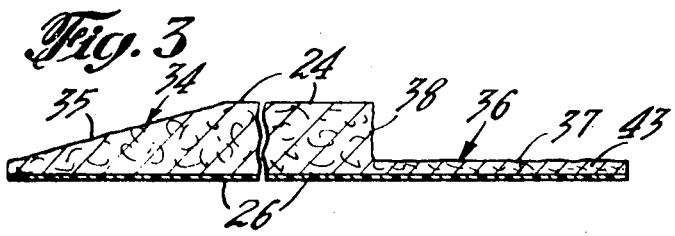
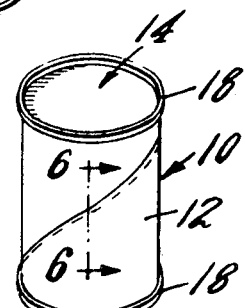
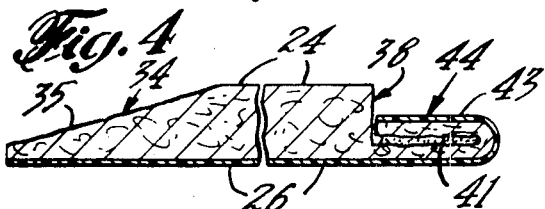
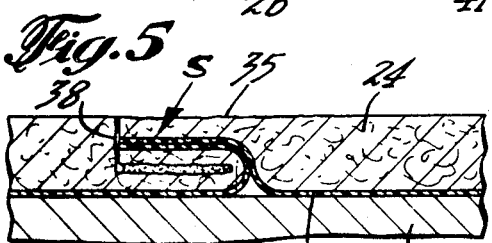
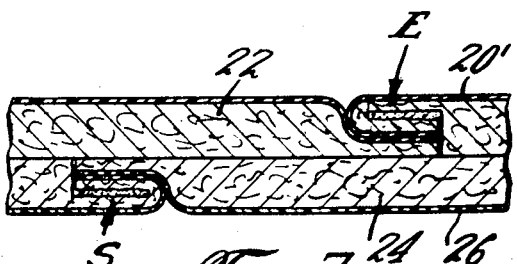
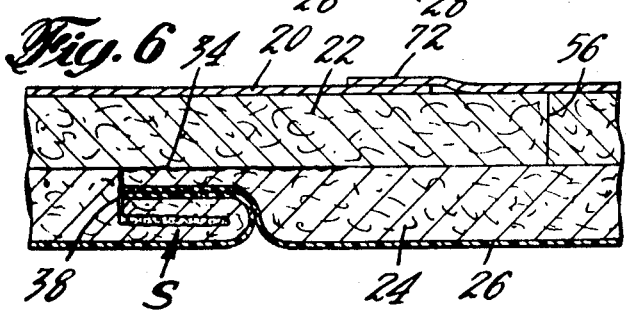
INVENTOR.
STEPHEN F. JENSEN
WILLARD A. MEYER
BY
George D Ziehmer
ATTORNEY

METHOD OF MAKING A CONTAINER BODY

BACKGROUND OF THE INVENTION

This application is a division of co-pending application Ser. No. 764,273 filed Oct. 1, 1968 now U.S. Pat. No. 3,540,490.

Spiral can-manufacturing techniques have resulted in the production of spirally wound container bodies wherein at least two strong, rigid fiber body plies are sandwiched between an inner, productproof liner ply and an outer moistureproof label ply. The properties of the barrier materials commonly used in these latter plies (e.g., aluminum foil, plastic film) are such that often only a very thin layer (e.g., under one thousandths of an inch) is needed to provide the required protection. To adapt such thin barrier materials to the handling required in the spiral can-manufacturing process, they have heretofore been prelaminated to a suitable strong backing layer (e.g., thin kraft paper) and the resulting laminations fed to the winder as separate plies which are independent of the main body plies and require their own handling and feeding equipment.

The present invention provides a container construction wherein the backing layer is eliminated and the barrier layer is integrated with a main body ply by being prelaminated, precoated, or otherwise preapplied directly to the main body ply prior to time the latter is wound onto the forming mandrel. Thus, by way of example, a thin layer of a plastic material such as polyethylene is extruded directly onto a main body ply and the resultant integrated barrier bearing body ply is substituted for the separate body and barrier plies heretofore used. This integrated ply construction is best adapted to provide the inner liner for the body, but it can, under some circumstances also be adapted to provide an external moistureproof body layer.

The physical nature of the barrier will be determined by the requirements of the finished container. Thus, the barrier can be a plastic such as polyethylene which is extruded directly onto a body ply, or can be thin aluminum foil which is adhesively secured to the body ply. If it is desired to also have the barrier function as a label, it may comprise thin, preprinted aluminum foil or thin preprinted varnished paper which is prelaminated to the outer body ply by means of a suitable adhesive.

In order to prevent leakage of fluids or moisture into the fiber body plies in the area of the marginal edge portions of the helically wound plies, and particularly at the ends of the body where these edge portions extend into the end seams, each prelaminated ply is treated in such manner as to form these edge portions into a sealed overlapped joint of a thickness substantially the same as the thickness of the other, adjacent portions of the ply. To this end, both marginal edge portions of the ply, on the surface opposite to that which carries the barrier layer, are skived or milled away, and one of the skived edge portions is folded back on itself, and then lapped over and sealed to the opposite skived edge portion, thus forming a single thickness lapped helical seam which winds smoothly onto the winding mandrel without abrasion of its surfaces and minimizes or eliminates the formation of projecting stepped portions in the helical seam which might provide open channels to permit the flow of the product into the end joints of the container, and thence into the main body plies.

Thus, it can be seen that a main object of this invention is to reduce the number of separate plies of stock which must be fed onto the winding mandrel of a spiral winder in order to produce a strong, leakproof, spirally wound container body, and that other advantageous results such as operating and material economies, and a better, more integrated body construction, are also achieved.

SUMMARY OF THE INVENTION

In making a tubular container body, a main body ply of fiber material having a barrier prelaminated or otherwise preaffixed on one surface thereof is helically wound on a mandrel. As the integrated prelaminated body ply is fed to the winding mandrel, edge portions of its opposite unprotected surface are removed by skiving, thereby to form marginal edge portions of reduced thickness. Subsequently, one of said marginal edge portions is folded back on itself with said barrier disposed externally of the fold, and the ply is helically wound on a mandrel in such manner that the folded-back portion is lapped over and indented into the unfolded skived opposite edge portion, and bonded thereto, as by fusion, to form a leakproof, single thickness helical lap joint.

BRIEF DESCRIPTION OF THE DRAWINGS

FIG. 1 is a schematic plan view of an apparatus capable of preforming the method steps of the instant invention;

FIG. 2 is a perspective view of a sealed composite container having a spirally wound body formed according to the present invention;

FIG. 3 is a fragmentary sectional detail taken substantially along the line 3—3 of FIG. 1 and showing the integrated, prelaminated inner body ply skived on opposed marginal edge portions;

FIG. 4 is a fragmentary sectional detail taken substantially along the line 4—4 of FIG. 1 and showing one of the marginal edge portions of the integrated ply folded back on itself;

FIG. 5 is a sectional detail taken substantially along line 5—5 of FIG. 1 and showing the helical seam formed after the folded back edge portion of the integrated ply has been lapped over and embedded into the unfolded opposite skived edge portion of the ply during the spiral winding operation;

FIG. 6 is an enlarged sectional view taken substantially along the line 6—6 in FIG. 2; and FIG. 7 is a sectional view similar to FIG. 6, but on a reduced scale, showing a modified form of the invention.

BRIEF DESCRIPTION OF THE PREFERRED EMBODIMENTS

As a preferred and exemplary embodiment of the instant invention, FIG. 2 shows a composite container 10 which is formed with a cylindrical, spirally wound body 12 having its opposite ends closed by top and bottom imperforate metal end closure members 14 and 16, respectively, which are suitably secured thereto in fluid-tight end seams 18 which may be of any suitable type. The body 12 is formed by winding various plies helically around a stationary mandrel 28 of a spiral winder (see FIG. 1) to form them continuously into a tube T which is subsequently cut into bodies 12 by cutting knives (not shown) in the usual manner. One end of the mandrel 28 is fixedly mounted in a mounting block 30, the other end of the mandrel 28 being free in order that the tube T may be discharged therefrom.

As seen in FIG. 6, the body 12 is formed by a suitable exterior label ply 20 (e.g., printed aluminum foil mounted on a paper backing), heavy outer and inner main body fiber e.g., kraft or chipboard) plies 22 and 24, respectively, and a liquidproof liner barrier 26, here shown as a thin layer of extruded polyethylene. In the several drawings, the relative thickness of the various plies and layers are greatly exaggerated for the sake of clarity of illustration.

The barrier 26 and the inner main body ply 24 are laminated to each other prior to the time they are wound on the mandrel 28, preferably before these plies are fed toward the mandrel 28, although it is possible to do this while they are being fed toward the mandrel 28. Prelaminating or preaffixing of the two materials 24 and 26 to one another is intended to encompass a fiber body ply 24 to which a liquidproof barrier 26 has been permanently joined, prior to reaching the mandrel 28, by any number of bonding techniques including the extrusion coating of a plastic (e.g., polyethylene, etc.) barrier film onto the body ply 24, the spraying of a barrier layer onto the body ply 24 or, if the barrier layer be a preformed layer such as thin aluminum foil, the laminating of it to the body ply 24 with a suitable adhesive.

The prelaminated integrated inner fiber body ply 24 is fed toward the mandrel 28 at the proper winding angle from a suitable supply roll (not shown) carried on an unwind stand (not shown). As the prelaminated ply 24 is fed toward the mandrel 28, the marginal side portions thereof, the side edges of which are initially squared or normal to the top and bottom surfaces of the ply, are skived by a pair of rotating abrading or milling knives 32 and 33, respectively. The knives 32,33 are rotated at high speeds to remove portions of the fiber body to form the contours substantially as shown in FIG. 3. The knife 32 operates to remove stock from the forward marginal edge portion (to the right as seen in FIG. 1) of the upper surface of the ply 24, to produce thereon a bevel portion 34 having a gently sloping skived surface 35 while the knife 33 produces in the rearward marginal edge portion a right angled step 36 which is defined by a flat skived surface 37, which is parallel to the barrier layer 26 which remains undisturbed on the reverse side of the ply 24, and a short vertical skived wall 38.

Thereafter, the skived body ply 24 passes below an adhesive applicator 40 which deposits a suitable adhesive 41, which may be water or solvent based or of the hot melt type, in the form of a continuous bead or film on the flat skived surface 37 of the stepped marginal edge portion 36. Subsequently, the body ply 24 is passed through a plow 42 having a cam surface formed thereon which folds the outer portion 43 of the stepped marginal edge portion 36 backwardly over the inner portion thereof to form a fold or hem 44 (as shown in FIG. 4), the bead or film of adhesive 41 being spread out within the fold 44 as the latter is formed.

The fold 44 then passes between a pressure roller 46 and a suitable underlying support (e.g., another roller, not shown) which cooperate to press the fold 44 with the adhesive 41 therebetween to form it into a solid, adhesively seamed structure. If desired, a water or solvent based adhesive 41 may be selected which will penetrate and impregnate the fiber portions of the fold 44 and thus provide an auxiliary barrier to the leakage of liquid into the body ply 24 in the event that a crack or tear should inadvertently occur in the barrier layer 26 of the hem 44 during the folding operation.

The laminated fiber body ply 24, formed as heretofore described, is then wound onto the mandrel 28 with the liner barrier 26 contacting the mandrel 28. As the ply 24 is wound on the mandrel 28, its bevelled marginal edge portion 34 is laid onto the hem 44. Under the pressure of the winding, the bevelled portion 34 is reshaped, as it is wound onto the hem 44 of the folded marginal edge portion 35, to the configuration shown in FIG. 5, so that in effect, the hem 44 is indented into the bevel portion 34 and forms a single thickness lap seam S which forms a smooth non-projecting portion of the wound ply 24.

More specifically, in the process of contacting the fold 44, which is supported directly on the mandrel 28, the marginal edge portion 34 is offset outwardly radially from the center line of the mandrel 28. In being thus forced out radially, the bevelled marginal edge portion 34 is reshaped substantially from a contour of FIG. 4 wherein its skived surface 35 forms a sloping extension of the surface of the adjacent unskived central portion of the body ply 24, to the contour of FIG. 5 wherein it forms a substantially straight extension thereof. These reformed areas will not, of course, be completely smooth, but any surface irregularities therein will tend to be ironed out as the formation of the tube T progresses.

It will be noted that the mutually contacting surfaces of the marginal edge portions of the ply 24 within the seam S comprise portions of the barrier layer 26. In order to seal the seam S and prevent leakage of product through it and into the interior of the ply 24, these mutually contacting barrier surfaces are heated by suitable heaters, as by directional, controlled gas flames 47,48, in order to soften the plastic barrier material 26 and cause it to fuse together in the interior of the seam S (as shown by the small s in the drawings) and thus bond the lapped marginal edge portions together.

If the barrier 26 is not a thermoplastic material, a separate adhesive can be applied to the fold surface 43, as the ply 24 approaches the mandrel 28, in order to obtain an adhesive bond in the seam S.

As will be apparent in FIG. 5, the thickness of the helical seam S is substantially that of the laminated body ply 24. In this regard, it is noted that it is undesirable to have a helical seam which is substantially thicker than the body ply 24 because there would be a tendency for leak channels to occur where the thicker helical seam portions are incorporated in the end seams 18 which affix the ends 14,16 to the container body 12, thus facilitating passage of the product into the end seams 18. In addition, if the seam S were thicker than the body ply, its inside surface would be subject to abrasion as it moved along the mandrel 28 because of the concentration of pressure in such thicker areas.

According to the present invention, the total thickness of the helical seam S is controlled to obtain the desired seam thickness by controlling the depths to which the fiber material is skived from the marginal edge portions 34,36.

After the laminated body ply 24 has been wound onto the mandrel 28, the outer main body ply 22 is wound on top of it. The ply 22 is fed from a suitable supply roll (not shown) and approaches the mandrel 28 from the side opposite to that from which the laminated body ply 24 approaches it. The inner surface of the body ply 22 is coated with a film of adhesive 52 by an applying roller 54 to cause it to adhere to the outer surface of the ply 24, and its edges may be butted together as indicated by the numeral 56 or jointed in any other suitable manner, as by the skived joint disclosed in U.S. Pat. No. 3,280,709.

The partially formed tube structure is then passed through a winding belt 64 which is wrapped around the mandrel 28. The belt 64 is mounted on a driving drum 66 and an idle drum 68 and functions to compress the wound plies and to rotate and advance the partially formed tube longitudinally along the mandrel 28 and to pull the various tube plies from the supply rolls. The pressure of the winding belt helps to smooth out any irregularities in the surfaces of the seam S.

After the partially formed tube structure emerges from the belt 64, the label ply 20 is fed onto it at the winding angle and wrapped around it to form the completed tube T. Prior to reaching the mandrel 28, the label ply 20 has an overall film of an adhesive (not shown) applied to its inner surface by an applying roll 70. Although the label ply 20 is shown in the drawings as consisting of a single layer, it may and usually does consist of thin foil (e.g., aluminum) prelaminated to a supporting paper backing layer. The label ply 20 preferably is preprinted with suitable unitary label designs L (see FIG. 1) and is of sufficient width to provide an overlapped helical joint 72 (FIG. 6).

After completion of the tube T, it is cut into suitable lengths and discharged in any suitable manner over the free end of the mandrel 28. The cutting of the tube T in registration with the label patterns L may be done in accordance with the method described in E. B. Robinson U.S. Pat. No. 2,737,091, granted Mar. 6, 1956.

FIG. 7 illustrates a container construction wherein the principles of the instant invention are applied to the outer body ply 22, as well as to the inner body 24. In this construction, the external barrier 20', which may be a suitable material such as an extruded plastic or an adhesively secured paper, metal foil or plastic film (which materials may or may not carry a label pattern L) is preapplied to the body ply 22 in the same manner as the inner barrier 26 is preapplied to the inner body ply 24. The resultant integrated, prelaminated ply has its opposing edges skived, folded, overlapped, and bonded together to form an external, sealed, helical seam E which is substantially similar to the internal seam S, to thereby provide a body which is completely impervious to both internal and external fluids and moisture. If desired, an additional body ply (or plies) may be interposed between the plies 22,24 to provide an even stronger heavier, body construction. The seams E and S are preferably offset from each other a suitable distance (preferably one-half the pitch of the tube) to insure a strong, solid tube structure.

It is thought that the invention and many of its attendant advantages will be understood from the foregoing description and it will be apparent that various changes may be made in the form, construction, and arrangement of the parts and that changes may be made in the steps of the method described and their order of accomplishment without departing from the spirit and scope of the invention or sacrificing all of its material advantages, the form hereinbefore described being merely a preferred embodiment thereof.

We claim:

1. A method of container manufacture, comprising providing a fiber ply on one surface of which a barrier material has been preaffixed, skiving one marginal edge portion of the reverse side of said body ply with a right angled skive and the opposite marginal edge portion with a bevel skive to provide marginal edge portions of reduced thickness, each bounded by a skived fiber surface and a section of the barrier material, folding the right angled skived material edge portion over on itself with the barrier material on the outside of the fold, heating portions of the barrier material on each marginal edge portion to fusion temperature, helically winding the resulting structure to bring its opposed marginal edge portions into overlapping relationship, and bringing the unfolded marginal edge portion of said body ply into pressured engagement with the folded marginal edge portion to thereby indent the folded marginal edge portion of said body ply into its unfolded marginal edge portion and to bring the heated portions of the barrier material on said marginal edge portions into mutual engagement to fuse them together, whereby to form a smooth leakproof helical lap joint.

* * * * *